(12) United States Patent
Randall et al.

(10) Patent No.: US 9,374,624 B2
(45) Date of Patent: Jun. 21, 2016

(54) METHOD AND APPARATUS FOR AUTO-TUNING PROGRAM GUIDES

(71) Applicant: THOMSON LICENSING, Issy de Moulineaux (FR)

(72) Inventors: Darrel W Randall, Danville, IN (US); Steven C. Rhoads, Carmel, IN (US)

(73) Assignee: THOMSON LICENSING, Issy les-Moulineaux (FR)

( * ) Notice: Subject to any disclaimer, the term of this patent is extended or adjusted under 35 U.S.C. 154(b) by 53 days.

(21) Appl. No.: 14/177,431

(22) Filed: Feb. 11, 2014

(65) Prior Publication Data

US 2014/0157323 A1     Jun. 5, 2014

Related U.S. Application Data

(63) Continuation of application No. 14/086,388, filed on Nov. 21, 2013, now abandoned.

(60) Provisional application No. 61/730,641, filed on Nov. 28, 2012.

(51) Int. Cl.
| | |
|---|---|
| *G06F 3/00* | (2006.01) |
| *G06F 13/00* | (2006.01) |
| *H04N 5/44* | (2011.01) |
| *H04N 21/482* | (2011.01) |
| *H04N 5/445* | (2011.01) |

(Continued)

(52) U.S. Cl.
CPC ....... *H04N 21/4828* (2013.01); *H04N 5/44543* (2013.01); *H04N 21/4314* (2013.01); *H04N 21/440263* (2013.01); *H04N 21/4821* (2013.01); *H04N 21/4823* (2013.01); *H04N 2005/44556* (2013.01)

(58) Field of Classification Search
CPC .................................................... H04N 21/482
USPC ................................ 725/48, 49, 50; 348/734
See application file for complete search history.

(56) References Cited

U.S. PATENT DOCUMENTS

| | | | | |
|---|---|---|---|---|
| 5,751,282 A | * | 5/1998 | Girard et al. .................. | 715/721 |
| 6,243,565 B1 | | 6/2001 | Smith | |
| 6,407,779 B1 | * | 6/2002 | Herz ............................. | 348/734 |

(Continued)

FOREIGN PATENT DOCUMENTS

| | | |
|---|---|---|
| DE | 102010000057 | 7/2011 |
| WO | WO0211451 | 2/2002 |

(Continued)

OTHER PUBLICATIONS

International Search Report for PCT/US12/57166 dated Dec. 14, 2012.

(Continued)

*Primary Examiner* — Dominic D Saltarelli
(74) *Attorney, Agent, or Firm* — Brian J. Dorini; Jeffrey M. Navon

(57) ABSTRACT

A user interface for a content distribution system is disclosed which allows a manager of an environment of TV sets to view which content is playing on individual TV sets, and to change, track and otherwise adjust the content. The invention advantageously provides these features without interfering with other TV sets' programming when another TV set is being adjusted, changes or tracked by the manager. The invention provides auto-tuning of program guides.

10 Claims, 11 Drawing Sheets

(51) Int. Cl.
*H04N 21/431* (2011.01)
*H04N 21/4402* (2011.01)

(56) References Cited

U.S. PATENT DOCUMENTS

| | | |
|---|---|---|
| 2003/0145323 A1 | 7/2003 | Hendricks et al. |
| 2004/0185887 A1 | 9/2004 | Wolman et al. |
| 2008/0095155 A1 | 4/2008 | Danzig |
| 2008/0137661 A1 | 6/2008 | Kwon et al. |
| 2008/0159140 A1 | 7/2008 | Robinson et al. |
| 2010/0192179 A1 | 7/2010 | Ellis et al. |
| 2011/0030010 A1 | 2/2011 | Overbaugh |
| 2012/0297423 A1 | 11/2012 | Kanojia et al. |

FOREIGN PATENT DOCUMENTS

| | | |
|---|---|---|
| WO | WO2005115000 | 12/2005 |
| WO | WO2012149239 | 11/2012 |

OTHER PUBLICATIONS

International Search Report for PCT/US12/54744 dated Jan. 8, 2013.

* cited by examiner

METHOD AND APPARATUS FOR AUTO-TUNING PROGRAM GUIDES

RELATED APPLICATIONS

This application claims the benefit under 35 U.S.C. §119 (e) of U.S. provisional patent application Ser. No. 61/730,641 filed on Nov. 28, 2012 entitled Method and Apparatus for Auto-Tuning Program Guides, the teachings of which are also specifically incorporated herein by reference; and is a continuation of U.S. Utility patent application Ser. No. 14/086388 filed on Nov. 21, 2013.

FIELD OF THE INVENTION

The present invention relates to quadrature amplitude modulated (QAM) signals and the use of QAM modulators. More specifically, the present invention relates to user interfaces for use with the dynamic modification of QAM signals wherein multiple QAM channels can be sent to multiple video display devices with a single transport stream from a QAM modulator and for auto-tuning program guides for systems employing such signals.

BACKGROUND OF THE INVENTION

There are many environments where multiple video display devices, for example televisions (TV) exist, but a few tuners/receivers are in place to send audio and video to the TVs. Sports bars are a prime example of such an environment, but many others such examples are extant, especially when it is desired to send different channels or subchannels to different places in an environment, but to save cost, only a limited number of receivers are provided.

In the sports bar environment, for example, bartenders want to be able to control the content on each TV without having to use single or multiple TV remotes, since using a TV remote may cause adjacent TVs to also change channels. Using a remote in a sports bar thus now requires walking to each TV with a specific remote to change the channel, which may cause other nearby TVs to also change channels.

One such receiver, although there are many such receivers, which is often placed in a multiple TV environment such as a sports bar is the DirecTV® COM1000 content distribution system (designed and manufactured by TECHNICOLOR Inc., the owner of the present application and invention), which is a satellite TV receiver system capable of tuning and transcrypting up to 24 TV channels and which tunes and demodulates an MPEG-2 transport stream for further distribution in an environment through, for example, a QAM modulator device or an internet protocol (IP) data distribution system, for example an IPTV system. The DirecTV® COM1000 is ideal for the multiple TV environment such as hotels, sports bars, and the like.

The DirecTV® COM1000 includes a QAM modulator card or board which receives the demodulated MPEG-2 transport stream for further distribution. The card is denoted a QAM24 modulator and it receives MPEG-2 transport packets from an Ethernet port and then QAM modulates the MPEG-2 transport packets on one of twelve carrier frequencies. Each input stream results in one output QAM modulated channel (such as cable channel 50-1). However, nothing in the current content distribution systems allows individual receivers to play separate content on each TV without controlling the content with a separate remote for each TV.

Moreover, currently there is no way in which a manager of such an environment, for example a Bartender in a sports bar, can search for video content and see what channels are currently playing and to allows the content to changes, tracked and otherwise adjusted.

A television display system needs to display an interactive program guide with current and future program information for each channel. In order to acquire the information, the system must tune to the frequency on which the program information is being broadcast. This information may be stored for all known channels, but will not initially be available, and will become stale over time. For this reason, the channel must be tuned as the user navigates within the interactive guide.

Some generations of Technicolor DirecTV receivers have automatically tuned to the associated channel when the user highlights the channel designator in an on-screen guide, but this was only to display the channel in the scaled video window, not to acquire associated data. It would therefore be desirable to provide a user interface and system to perform such tasks, in order to acquire the necessary programs and data for auto-tuning of program guides.

SUMMARY OF THE INVENTION

When displaying an interactive program guide, the current and upcoming program information must be acquired and displayed for the currently highlighted channel. As each channel is highlighted, the system will tune to the associated channel in order to acquire the current and upcoming program information, and to provide a preview of the highlighted channel in a scaled video window. Such auto-tuned program guides are incorporated in remote controls which can be operated by a user or manager of a multiple display environment having statically tuned channels on each of the displays. By utilizing the refreshable program guides and user interfaces on such remote controls, the manager can update each of the displays independently from a single remote control. The invention will be best understood by reading the following detailed description of the preferred embodiments thereof in conjunction with the drawings which are first described briefly below.

DETAILED DESCRIPTION OF PREFERRED EMBODIMENTS

Figure 1:
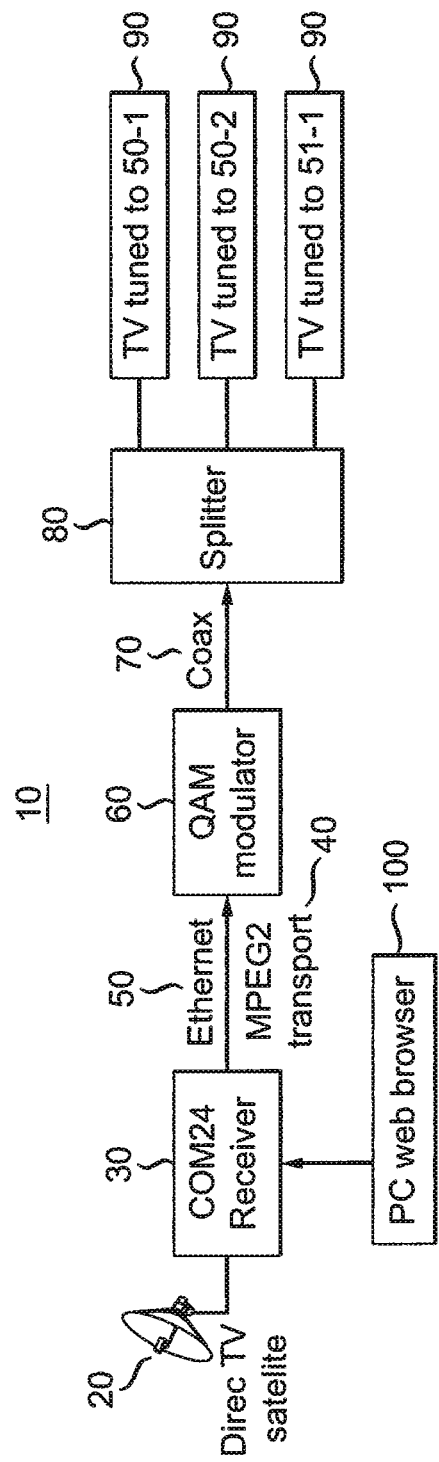
FIG. 1 is a block diagram of a content distribution system in accordance with the present invention.

Referring now to the Figures wherein like reference numerals refer to like elements, in FIG. 1 a preferred embodiment of a content distribution system according to the invention is shown at 10. A satellite downloads a signal 20 which is input to a receiver 30 that demodulates the signal and produces an MPEG-2 transport stream 40 having packets, preferably user datagram protocol (UDP) packets, containing data and video programming to be distributed to the environment. The MPEG-2 transport stream 40 is preferably transported by an Ethernet link 50 to a QAM modulator 60 which modulates the MPEG-2 transport stream 50 in accordance with principle s of the present invention. While preferred embodiments of the invention utilize QAM modulators and MPEG-2 transport streams, it will be appreciated by those skilled in the art that other kinds of modulators are equally usable and many different types of transport protocols are also usable. Therefore, VSB modulators, QPSK modulators, OFDM modulators, and their equivalents are all covered by the current invention. Moreover, IP signaling transport streams, DVB transport streams, MPEG-4 transport streams, ARIB transport streams, and their equivalents are also covered by the invention.

Preferably, the QAM modulator 60 modulates the MPEG-2 transport stream 40 on one of twelve carrier frequencies. Each input stream 40 results in an output QAM modulated channel which is output over a coax cable 70 and split with a splitter 80. In this fashion, the QAM modulator 60 permits dynamic duplication of output channels so that each TV 90 may be statically tuned to a fixed channel, for example, channels 50-1, 50-2, 50-3, etc., thereby eliminating the necessity for each channel to be individually tuned with a separate remote and allowing different programs to be played on different TV sets 90 without interference from other, nearby TV sets being tuned with a remote control to provide different desired programs. Optionally, a PC web browser 100 is provided interfaced to the receiver 30 to control the data programming necessary to accomplish these results and to provide other functionality to perform the functions of content distribution system 10.

Figure 2:
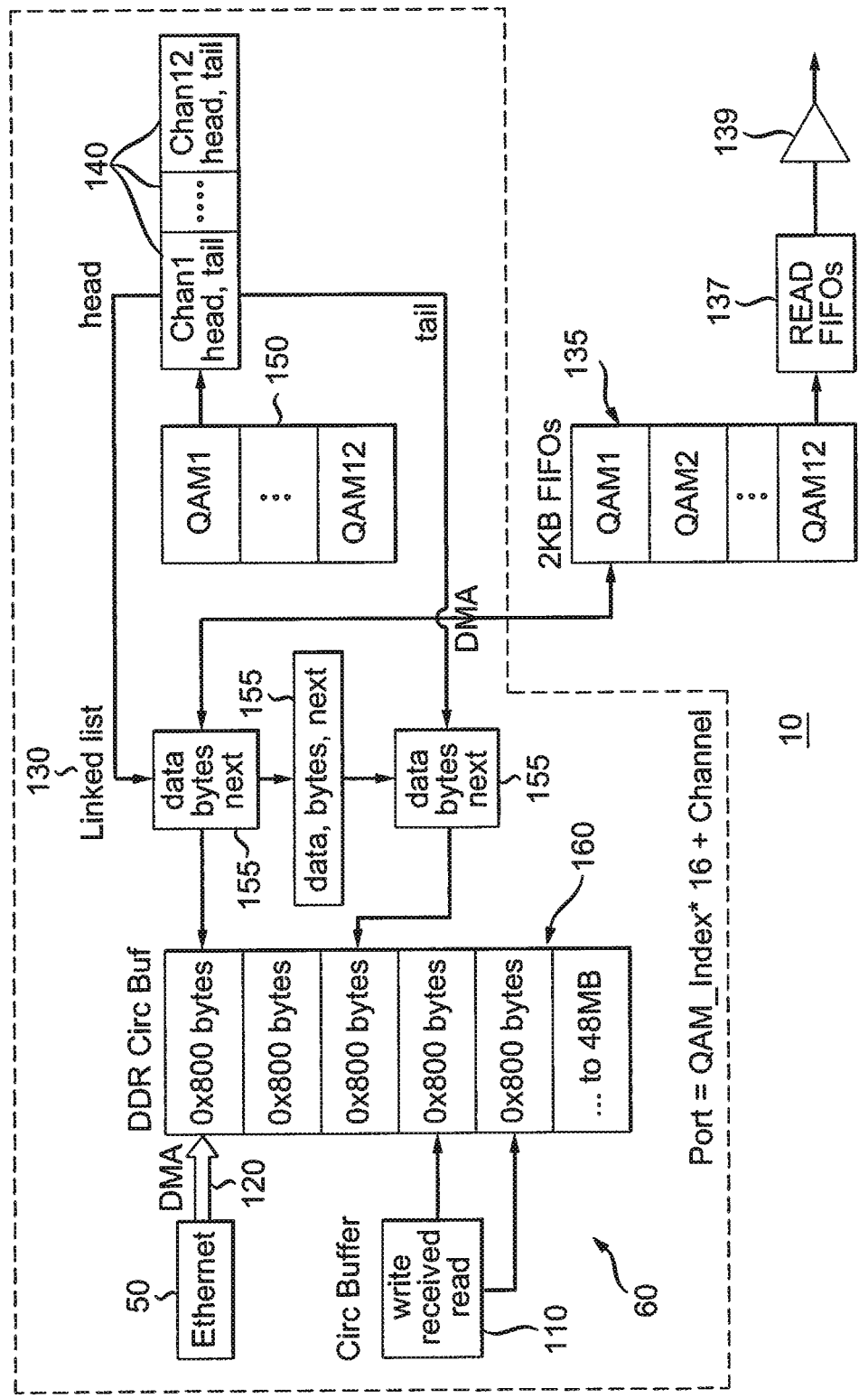
FIG. 2 is a block diagram of a preferred embodiment of a content distribution system and modulator in accordance with the present invention utilizing inventive DMA processes.

Referring to FIG. 2, the QAM modulator 60 supports 12 QAM streams 150 with up to 12 video channels per QAM stream. Each of the video channels 140 can have a bitrate of 20 Mbps with up to 500 ms of jitter that must be buffered. If a separate FIFO is used for each channel the memory buffer requirements are: 144 channels*20 Mbps*0.5 seconds/8 BitsPerByte=180 MB of buffering memory. However, it will be recognized that distributed systems typically are buffer limited and therefore only have limited memory capacities. The exemplary COM100 system only has 64 MB of DDR memory. Using a separate FIFO for each channel also requires that every transport packet be copied into the FIFO and then be copied out of the FIFO.

In order to overcome these issues, the inventive system 10 utilizes a new buffering model which reduces the amount of memory required for buffering and reduces the CPU load required to move the transport packets. When the Ethernet packets are received at an input port of modulator 60 they are automatically placed into a single circular buffer 110 by the Ethernet direct memory access (DMA) 120. Instead of then copying the transport packets into separate FIFOs based on the video channel, the transport packets are left in the common circular buffer 110. A descriptor 155 is created for each group of transport packets in a UDP packet. The descriptor indicates the memory location(s) 160 and number of bytes of the transport packets in the common circular buffer 110.

Instead of immediately moving the transport packets into a FIFO, the descriptors are placed in a linked list 130. This permits the common circular buffer 110 to be used as a jitter buffer for all channels 140. Since the maximum data rate of a QAM256 stream is 38.8 Mbps, the buffer memory requirements are: 12 QamStreams*38.8 Mbps/QamStream*0.5 seconds/8 BitsPerByte=29.1 MB of DDR memory. This solution also reduces how many times the transport packets must be copied since the packets do not have to be copied into separate per channel FIFOs.

Giving the QAM modulator 60 the ability to duplicate channels allows a single MPEG-2 transport packet to appear at multiple QAM frequencies, and further allows for multiple sub-channels to be statically tuned to a fixed digital cable channel on each TV 90. The COM24 receiver 30 can then be commanded to tune to a DirecTV channel (if, e.g., DirecTV is the service provider, but other providers may also be accessed) and to output an IP encapsulated MPEG-2 transport stream to the QAM modulator 60.

The input 40 to the QAM modulator 60 is a single program transport stream (SPTS) but the output of the QAM modulator 60 is a multiple program transport stream (MPTS) that is QAM modulated. This requires PID remapping and creation of a unique Program Map Table (PMT) for each channel to define the PIDs for each channel. The QAM modulator's input UDP port directly controls which QAM channel and sub-channel that is output.

Duplicating an input channel requires modifying the packet PIDs for each different output, and creating a different PMT. It is preferable to use a DMA to transfer a packet to a QAM modulation block. After the DMA is completed, the packet is then scheduled for another DMA to a different QAM modulation block as if that packet had also been received from the Ethernet connector on a different UDP port. This permits the packets to be "chained" in the linked list 130 from one UDP input port to the next UDP input port until the input channel has been duplicated the desired number of times.

The system 10 thereby implements a process which allows multiple TV receivers to be each statically set so that remote controls need not be used to change the programs for each TV. In order to accomplish this result and implement the DMA transfers of FIG. 2, first the UDP packets containing MPEG-2 transport packets are read from the Ethernet MAC by using the receive DMA engine to copy the Ethernet packets to main memory in circular buffer 110. The CPU then analyzes the destination UDP port number to add new entries to the correct pending list of DMA requests 130. There is one linked list of pending DMA requests 130 for each sub-channel 140 (up to 12) for each QAM carrier 150 (up to 12) for a total of 144 possible linked lists of pending DMAs. The DMA engine uses a linked list 130 of pending DMA requests (stored in RAM block). The pending DMA requests place the packets into circular buffer FIFOs 135. The data in FIFOs 135 are then read at 137 by the QAM modulator 60, and sent to an A/D converter 139 for eventual output to the content receiving devices, for example TVs. While FIFOs and circular buffers are used in preferred embodiments, it will be appreciated by those skilled in the art that any type of buffer memory that is adaptable for storing DMA requests may be used in the inventive systems.

All completed DMA requests are then finalized, and the size of the Ethernet packet is remembered while a counter which keeps track of how many packets are in the circular buffer is incremented. New DMA requests are then taken from 130 and started. In a preferred embodiment, the linked list 130 contains descriptors pointing to packets that eventually need to be DMA'ed, but the DMA has not yet been scheduled. Additionally, there is a separate linked list of DMA requests (not shown in FIG. 2) that have been started but the DMA hardware has not yet completed.

Figure 3:
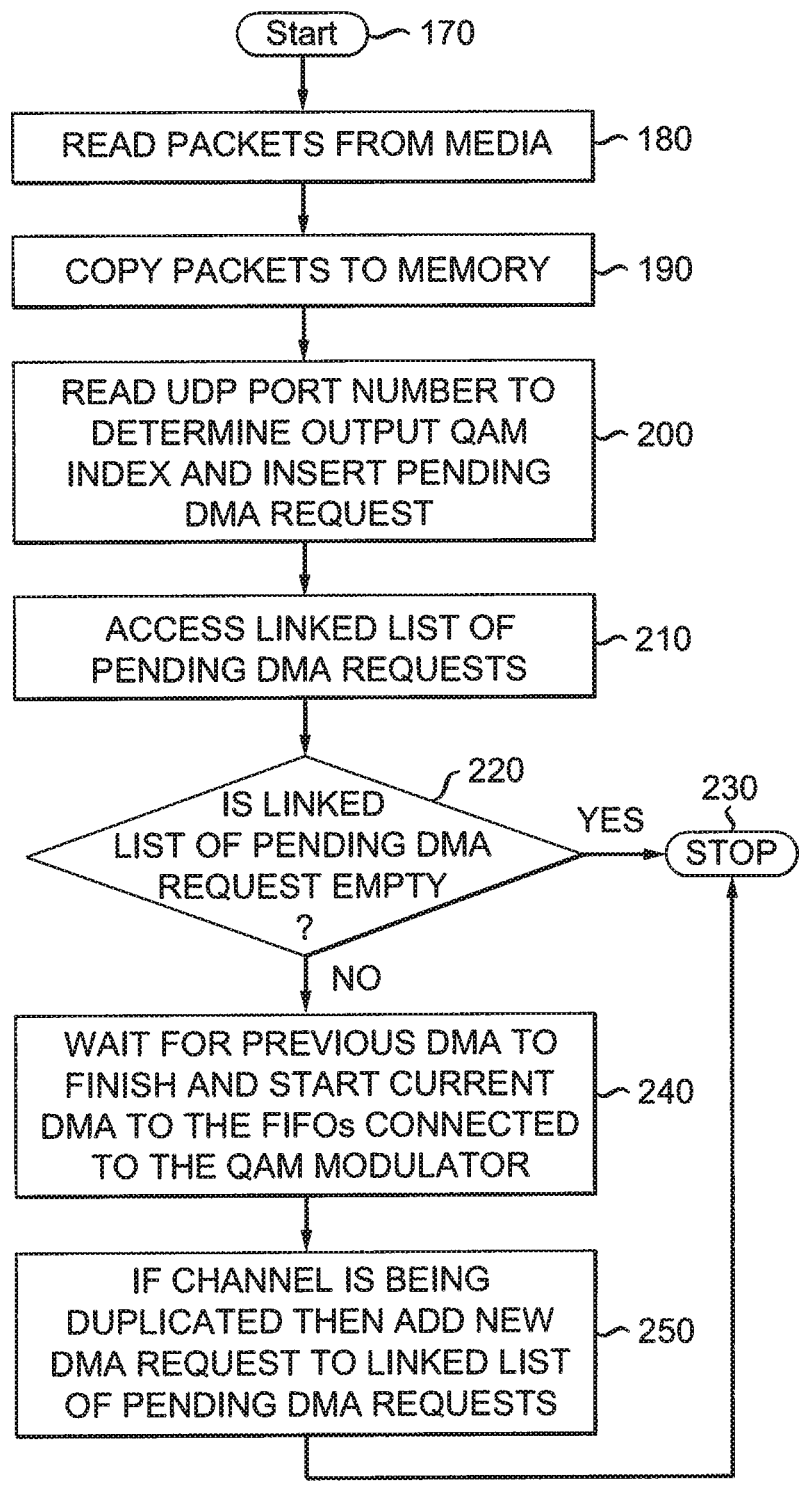
FIG. 3 is a flow chart of a preferred method provided in accordance with the present invention.
Figure 4:
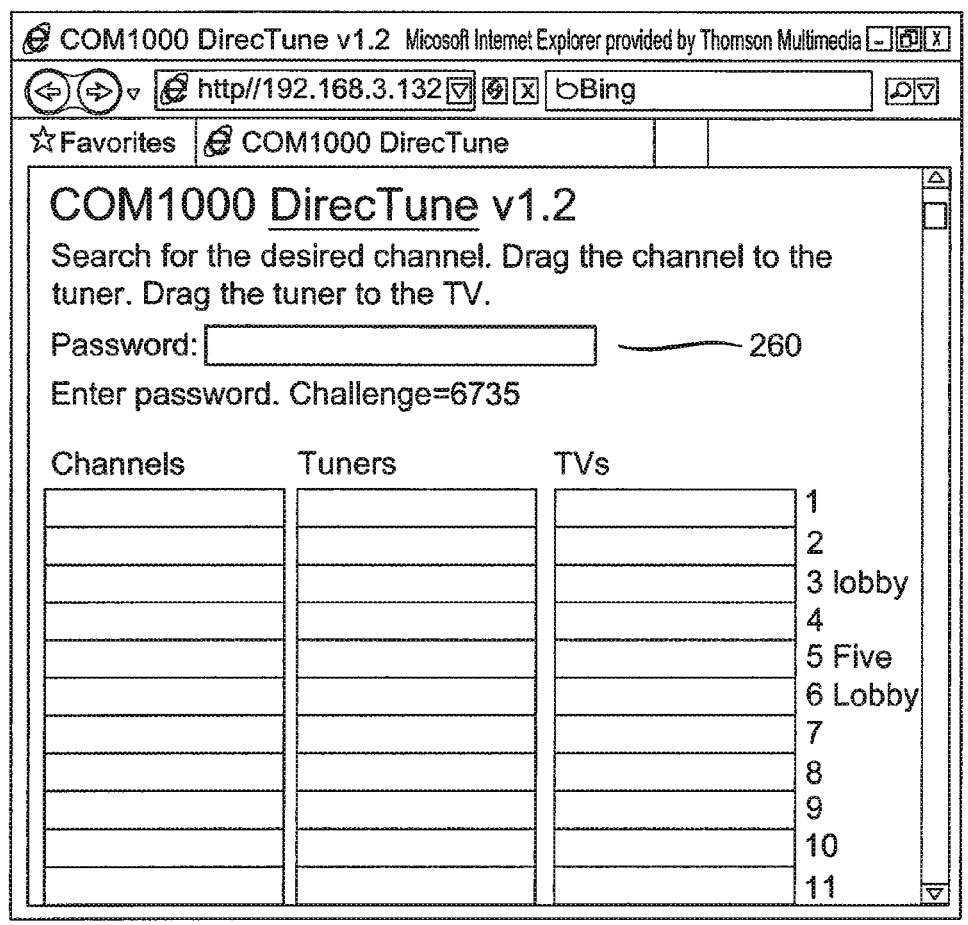
FIGS. 4-9 show various screen shots of the user interface of the present invention wherein different features of the inventive user interface are illustrated.
Figure 5:
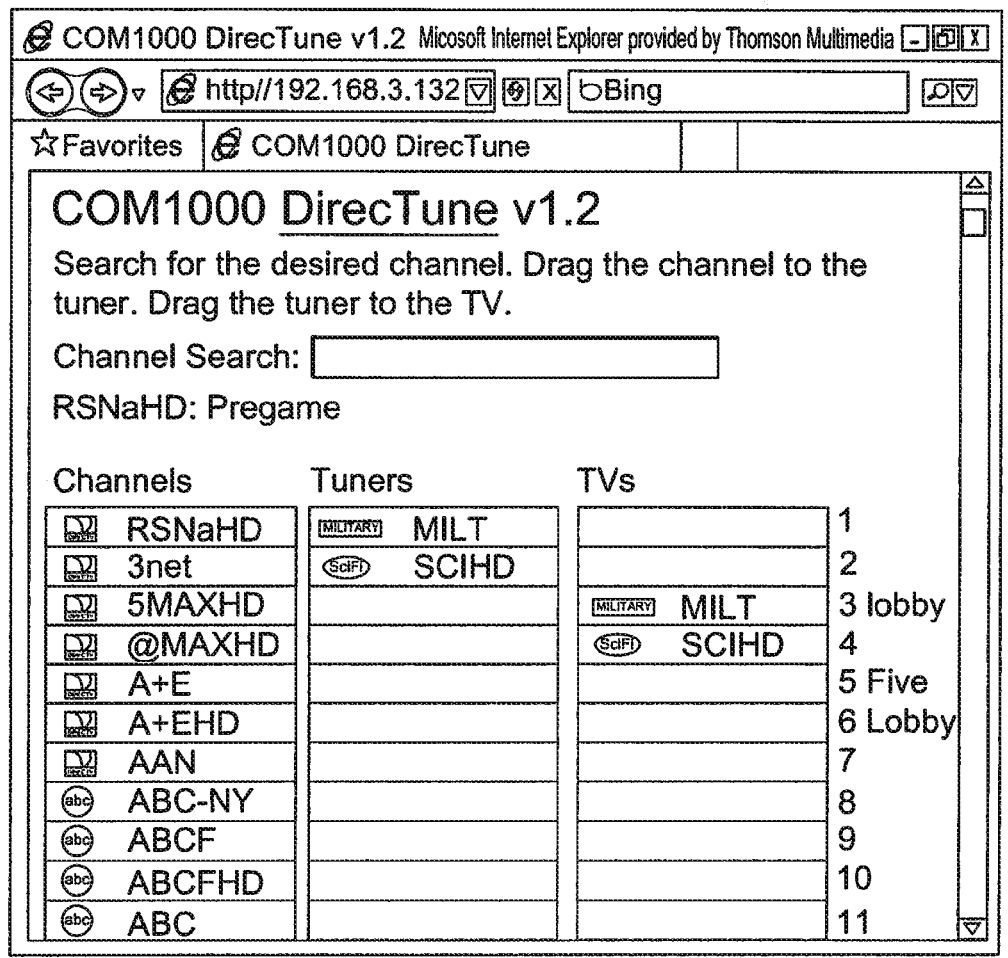

Referring to FIG. 3, a preferred method for assigning static channels or sub-channels in accordance with the invention begins at step 170. At step 180 the data packets are read from the media source, for example Ethernet port 50, but it will be recognized that other data sources may be used, for example the Internet, downloadable media, DVDs, Blu-ray discs, or other sources of packetized data. Additionally, it will also be appreciated that other than just video programs and content may be modulated and output in accordance with the invention. Data programs, games, computer programs, audio channels, wireless communications are all types of content which may be modulated and output in accordance with the invention. Moreover, many different types of devices other than video displays may receive the content. For example, audio receivers, computers, network devices, distributed networks and other devices and systems may also receive output modulated signals created in accordance with the invention.

At step 190, the data packets are copied to memory, preferably the circular buffer memory 110. At step 200 the destination UDP port number of the received UDP packet is read to determine the output QAM index and insert pending DMA requests. At step 210 the lists of pending DMA requests are accessed, and it is then determined at step 220 whether the linked list of pending DMA requests is empty. If so, then the method stops at step 230.

If however it is determined at step 220 that there is a current DMA request, then at step 240 the previous DMA requests must be finalized and the data packets associated with the current DMA request are DMA'ed to the FIFOs 135 attached to the QAM modulator. At step 250, if the current channel is being duplicated then the additional DMA requests are then added as new DMA requests to the linked list 130 of pending DMA requests and the method stops at step 230. Similarly, the packets associated with each of the DMA requests stored according to the linked list are output from the QAM modulator 60.

It will be further appreciated by those with skill in the art that QAM modulator 60 comprises a central processing unit (CPU) which is adapted to perform, among other necessary data processing and steps, the necessary steps taught herein to accomplish preferred embodiments of the invention. When performing these necessary steps, the CPU acts as a special purpose computer specifically programmed to perform these steps and functions.

The CPU of the QAM modulator 60 (preferably a Nios II CPU) analyzes the next Ethernet packet in the circular buffer 110 to determine the packet type and place MPEG-2 transport packets into the correct linked list 130 by analyzing the destination UDP port number. UDP packets with port 0x200–0x2ff are used to control the EdgeQam of QAM modulator 60 and query its status.

The UDP packets with port QamIndex*16+ChannelIndex contain MPEG-2 transport packets which are 188 bytes long. Up to seven MPEG-2 transport packets are in each UDP packet. The MPEG-2 transport packets are placed into linked lists 130. Each of the 12 QAM streams contains an array of 12 channels. Each channel has a linked list of MPEG-2 packets. There is a bitmap (12-bit integer) of which QAM stream has pending packets. Within a QAM stream there is a bitmap of which channels have pending packets.

The Nios II CPU looks at which FIFOs have space available and which linked lists have data and then schedules a DMA request. There is a bitmap (12-bit integer) of which FIFOs have space available. Each QAM stream is given a chance to schedule a DMA before the first QAM stream is analyzed again and within a QAM stream each channel is given a chance to schedule a DMA before the first channel is analyzed again.

Looping through the QAM streams and channels prevents one QAM stream or channel from delaying the data from the other channels. The DMA requests then go into a linked list of pending DMA requests.

In a further preferred embodiment, PC 100 can send commands to either the COM24 receiver 30, which then sends commands to the QAM modulator 60, or the PC 100 can directly send commands to the QAM modulator 60 to dynamically change which MPEG-2 transport streams being received by the QAM modulator are duplicated and dynamically change the desired destination QAM carrier and sub-channels. A single input channel can be duplicated multiple times such that a single MPEG2 transport stream could be duplicated up to 23 times so that 24 different TVs (each statically tuned to a different virtual channel) would all display the same video content. For example, if a sports bar had six tuners/receivers but 24 TVs, the QAM modulator can then act like a switching matrix to control which input MPEG-2 transport stream is sent to which output virtual channel so that each TV can be statically tuned to a fixed channel.

The content distribution system of the present invention thereby allows multiple television programs and channels to be output to multiple TV sets in an environment, thereby eliminating the need for remote controls to be used to change channels and potentially interfere with neighboring TV sets. Using the inventive QAM modulator and DMA process, the present invention permits the modulator to dynamically duplicate the output of channels, thereby allowing multiple TV sets to be statically tuned to a fixed channel. The modulator can then duplicate the output so that a single input MPEG-2 transport stream can send out multiple channels and sub-channels to each of the desired TV sets.

The inventive content distribution system thus provides a remarkably versatile yet simple system to display multiple programs on multiple devices from a single input transport stream. It would therefore also be useful to provide a user interface (UI) which allows for the control of all such programs and devices so that a manager of an environment can search for video content on all of the TV sets in the environment to determine what programs are playing on the various TV sets.

User interfaces of the present invention may be implemented as a HTML web page with Javascript. A known Javascript code to drag and drop boxes has been used to develop the inventive user interfaces, and may be found at luke.breuer.com/tutorial/javascript-drag-and-drop-tutorial.aspx. In accordance with the invention a UI, called the DIRECTUNE UI, implements the functionality of the inventive user interface using this Javascript. However, it will be appreciated that any type of script or programming language may be used to implement the inventive UIs taught herein, and those with skill in the art will design such UIs to satisfy the particular needs of content distribution systems as desired.

Referring now to FIGS. 4-9, the user interface is illustrated in which a manager of an environment can search for video content on all of the TV sets in the environment to determine what programs are playing on the various TV sets. When first entering the page, the user is asked for a password 260. The password can also be reset by entering a reset value that is based on the randomly generated Challenge field. After logging in, the password can be changed. At 270, an ability to poll the existing system and populate a display with known information once logged in is provided. The left column lists the channels available as filtered by the search parameter. The second column lists channels what channels are being processed by each tuner. The third column shows which channel each TV is viewing.

Preferably, the information to know what channels are currently playing is retrieved from an XML file that is available from the tuner device. The XML file may be generated using the following script:

```
<tunerList>
    <tuner>
        <chassis>8</chassis>
        <slot>3</slot>
        <index>1</index>
        <cardIp>192.168.3.132</cardIp>
        <ip>192.168.6.9</ip>
        <port>33</port>
        <streamId>0x80000004</streamId>
        <chan>1065710</chan>
    </tuner>
    ...
</tunerList>
```

Using an XML file permits the user interface to be easily replaced with a different technology such as Java, Flash, or a native executable.

A channel view of all available channels which can be accessed or viewed independently of the TV output selection is provided at 280. The Channel Search field 290 permits the user to search for channels based on the channel name, channel number, about text, channel category, or event categories. For example, entering "base red" shows channels with both "base" and "red".

The tuner server generates an XML file every five minute that lists the information necessary to display and search the channels. The web page reloads this XML file every five minutes according to the following script:

```
<channelList>
    <chan>
        <ma>13</ma>
        <mi>65535</mi>
        <n>ABC</n>
        <o>276834</o>
        <l>0</l>
        <e>Local News</e>
        <c>Local,News</c>
    </chan>
    ...
</channelList>
```

A Configurable TV view is provided at 300. View 300 provides the user interface with an ability to add more TV's per user's input or configuration and, for example, an ability to name TVs with custom names. (i.e. 1, 2, 3 or Bar, Lobby, Front Desk). The names of the TVs can be changed by entering a number followed by an equal sign followed by the name. For example, here TV #2 is changed to "Bob". Additionally, this feature allows a split screen showing TV view and channel view on a single page.

Figure 6:
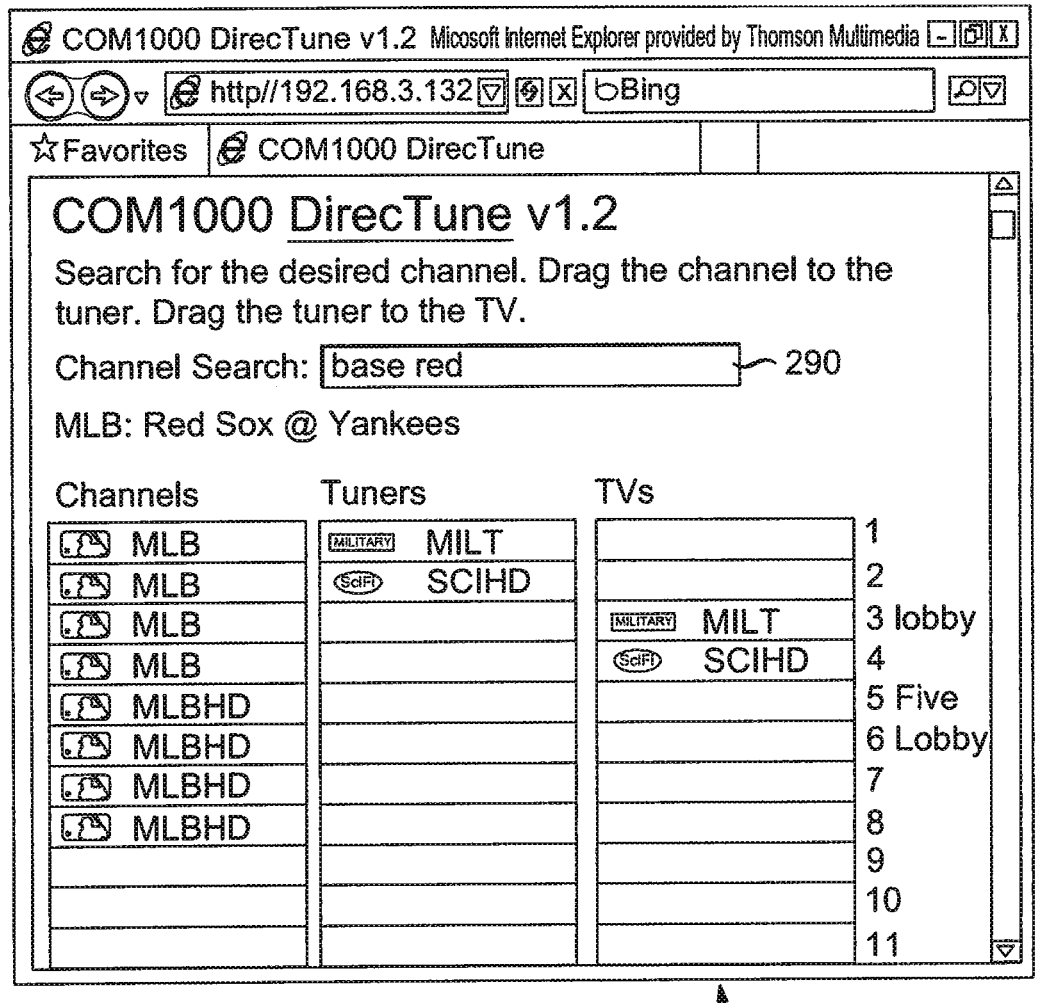

It is preferable to provide a drag and drop functionality 310 so that the manager can drag a desired channel from channel view and place it on a desired TV in TV view. FIG. 6 illustrates this functionality at 320 wherein the channel ABCFHD is being dragged to TV #3.

Figure 7:
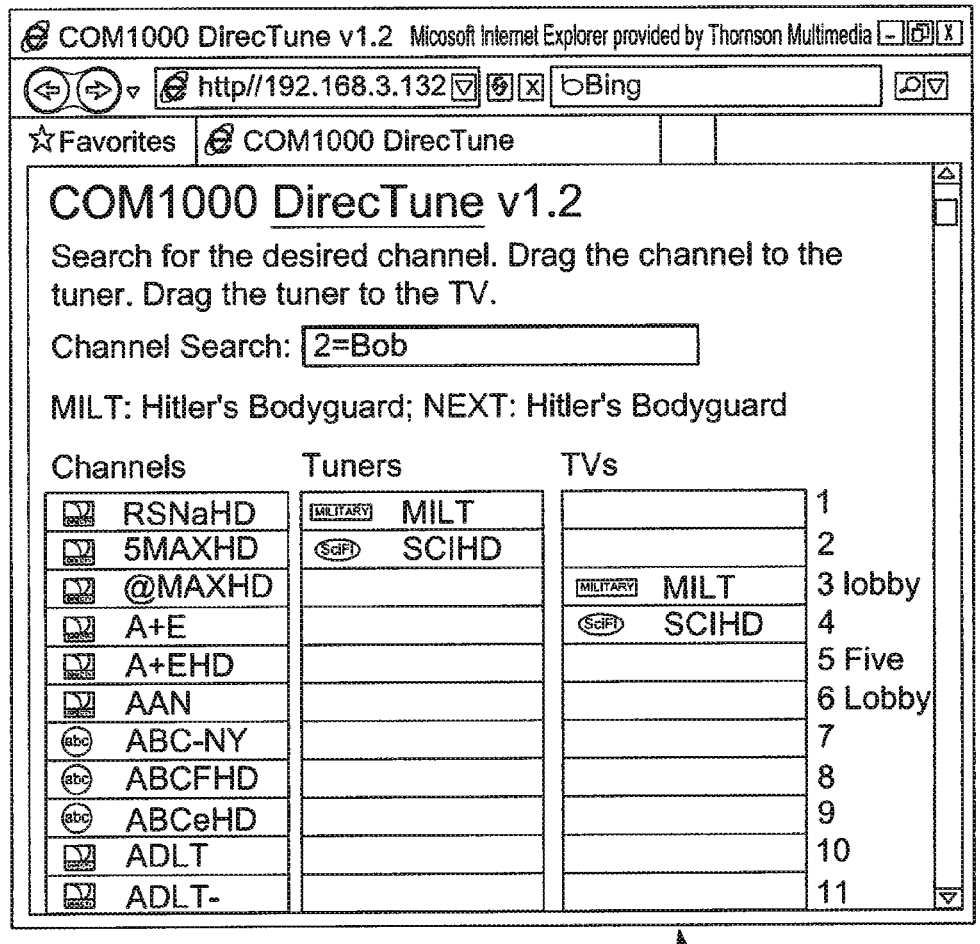
Figure 8:
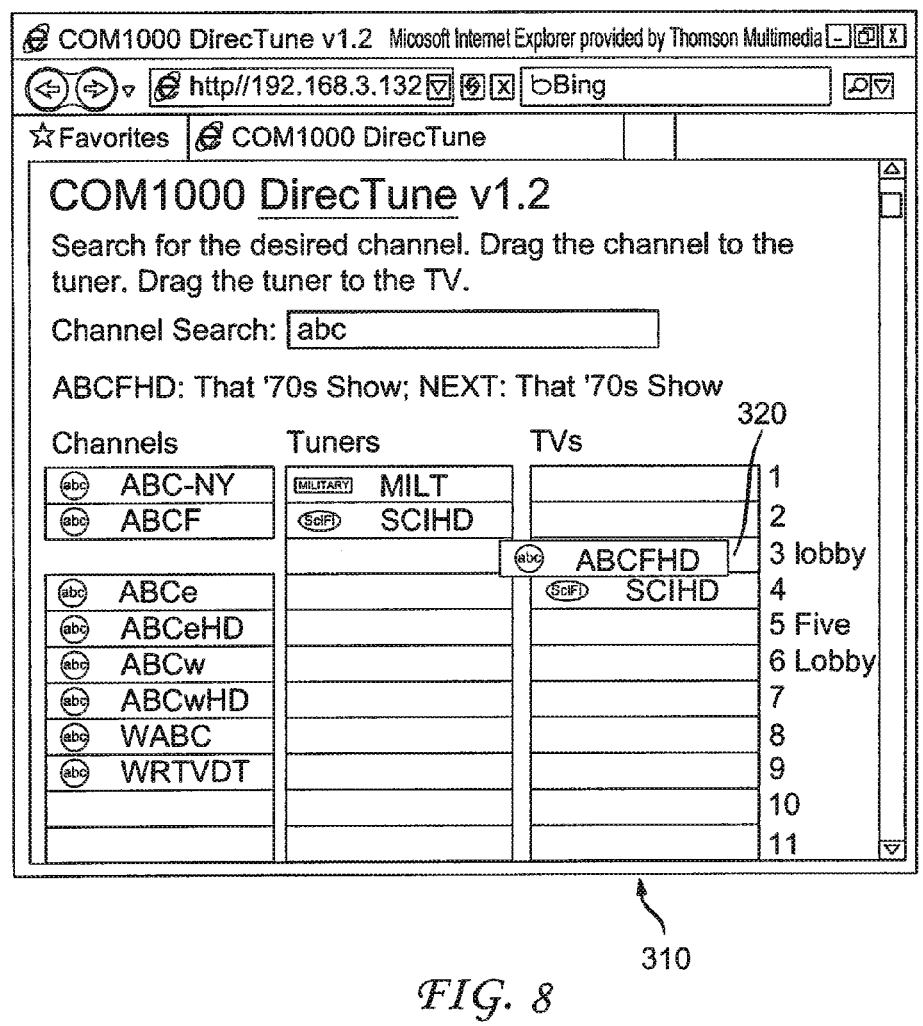
Figure 9:
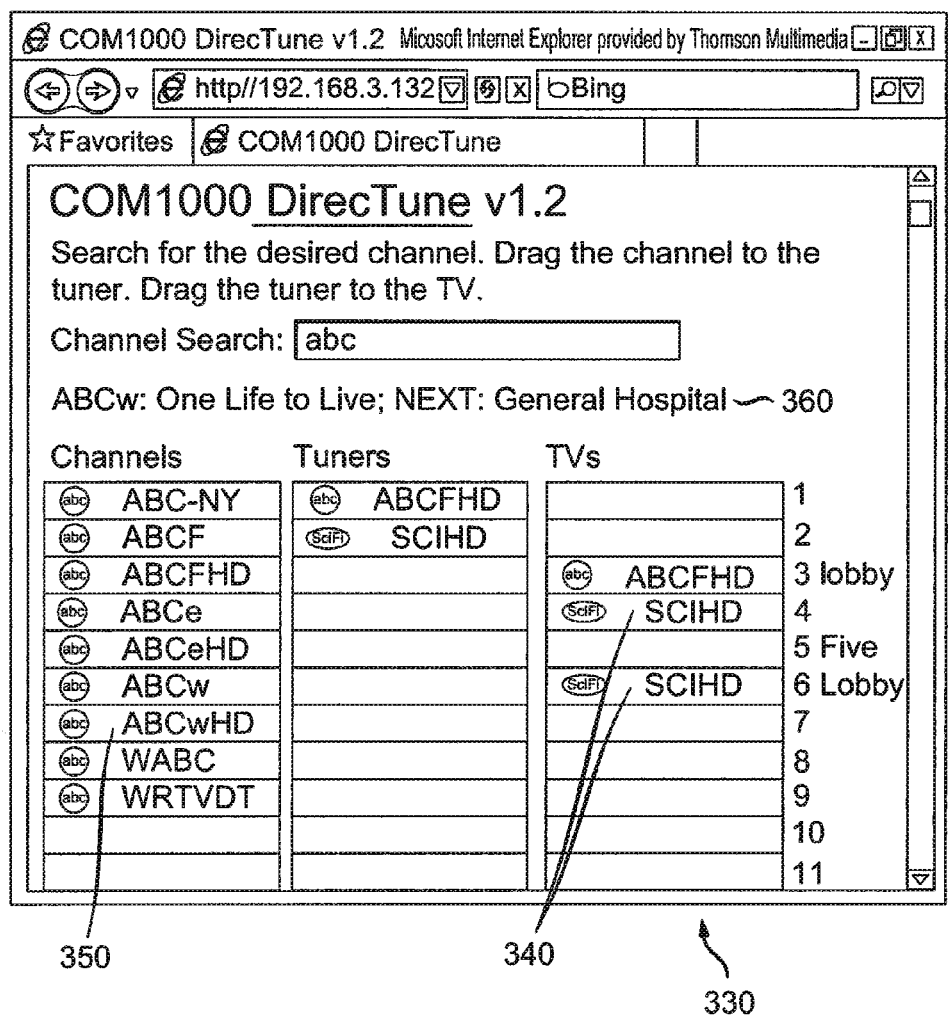

Support for as many different channels playing through the TV output as the number of tuners available in the COM1000 system is provided by the inventive interface at 330. FIG. 7 shows that the SCIHD channel 340 has been dragged and dropped to TV #6 so that both TV #4 and TV #6 are both displaying the SCIHD channel. Display of 'On-now' information for all channels is shown in the channel view. The interface also allows for adding a scheduler function which would list all channels and show guide information in a standard guide table.

In FIG. 7, the mouse was over the ABCw channel 350. The current program event and the next program event 360 are shown above the list of channels. In this case the program currently playing on ABCw is "One Live to Live".

It is preferable to provide an automated refresh command which will be sent to all DIRECTUNE interfaces currently logged into a content distribution system based on any tuning request made. Moreover, the channels.xml and tuners.xml files are reloaded every five minutes. The directune.html file is stored in a location that is user upgradable so that the user can modify the user interface and load an updated version back to the COM24 card. Attached hereto as Appendix 1 is an example of a preferred embodiment of an HTML script which implements the DIRECTUNE functionality of the inventive user interface.

Figure 10:
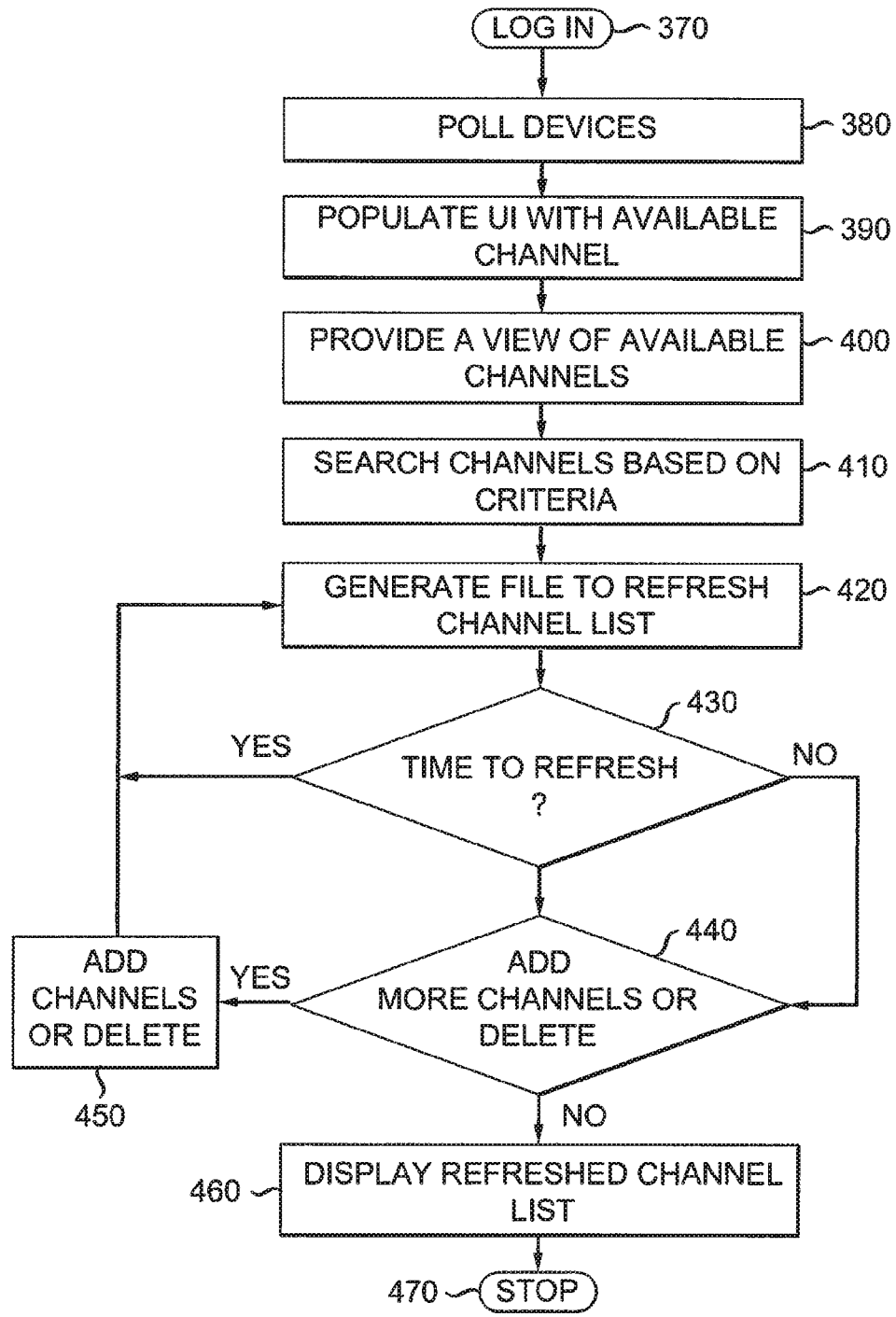
FIG. 10 is a flow diagram of a method of controlling a group of output devices which are statically tuned to individual outputs in accordance with an embodiment of the invention.

Referring now to FIG. 10, a method of controlling a group of output devices which are statically tuned to individual outputs in accordance with an embodiment of the invention is illustrated. It will be further appreciated that the methods will create dynamic UIs with which managers of environments having content distribution systems can control the systems from a central location without interfering with each of the devices to which a statically tuned output, for example a TV program, exists.

The method begins at step 370 wherein the manager logs into the system as described above. At this point, the login password may be changed, or otherwise managed. The system then polls at 380 the devices in order to populate the device on which the UI is displayed with system information, including which displays are, for example, displaying which programs. This preferably results in a population 390 of available channels to the content distribution system.

At 400, it is then preferable to populate a view of the available channels on the UI. This may be accomplished by the retrieval of the aforementioned XML file, or by equivalent retrieval of information from other sources, for example the content provider, the Internet, or internal sources. More preferably, the channel view of the available channels is thereby provided to the UI.

At 410, the manager searches the available channels based on a set of relevant criteria. This permits the manager to search for channels based on channel name, channel number, text, category, events, or other criteria specifically designed for, or peculiar to, the content distribution system as discussed above. At 420, it is desired to generate or refresh the retrieved file to generate or refresh the available channel list, as the case may be. During the initial set-up of the UI, the channel list is initially set-up. As other channels are added or deleted, then the list is updated to keep it accurate and useful for the systems manager. The list will be refreshed 430 every so often, for example every five minutes, but the manager may be provided with the ability to alter the refresh time according to the particular needs of the system. If it is determined at step 430 that it is time to refresh, then the method returns to step 420, otherwise, the system progresses to step 440 whether it is determined that new channels exist, or must be deleted. If so, then at step 450 the channels are added and the method returns to step 420 for the addition or deletion of the channels from the file. Otherwise, the method progresses to step 460 wherein the refreshed list is displayed. The method then stops at step 470.

The invention may be used in any system that includes channel and/or channel guide information along with the video stream information on that channel. This is common in the terrestrial or cable broadcast systems. However, in a satellite system, guide information is maintained as part of a separate database structure.

A preferred embodiment is in a multi-client delivery system such as the COM1000 using a QAM distribution system and specialized digital terminal adaptors, for example the DCI401MCS digital adaptor provided by Technicolor. The distribution system does not provide two way communications. As a result, it is necessary, in order to access the channel information, to tune the channel that is highlighted in the guide. The mosaic guide itself is built either as part of initialization or as a continuous update. The current channel program information is made available upon highlighting the channel by tuning to the channel. The video stream for the highlighted channel along with the channel program information is then displayed in conjunction with the program guide.

Figure 11:
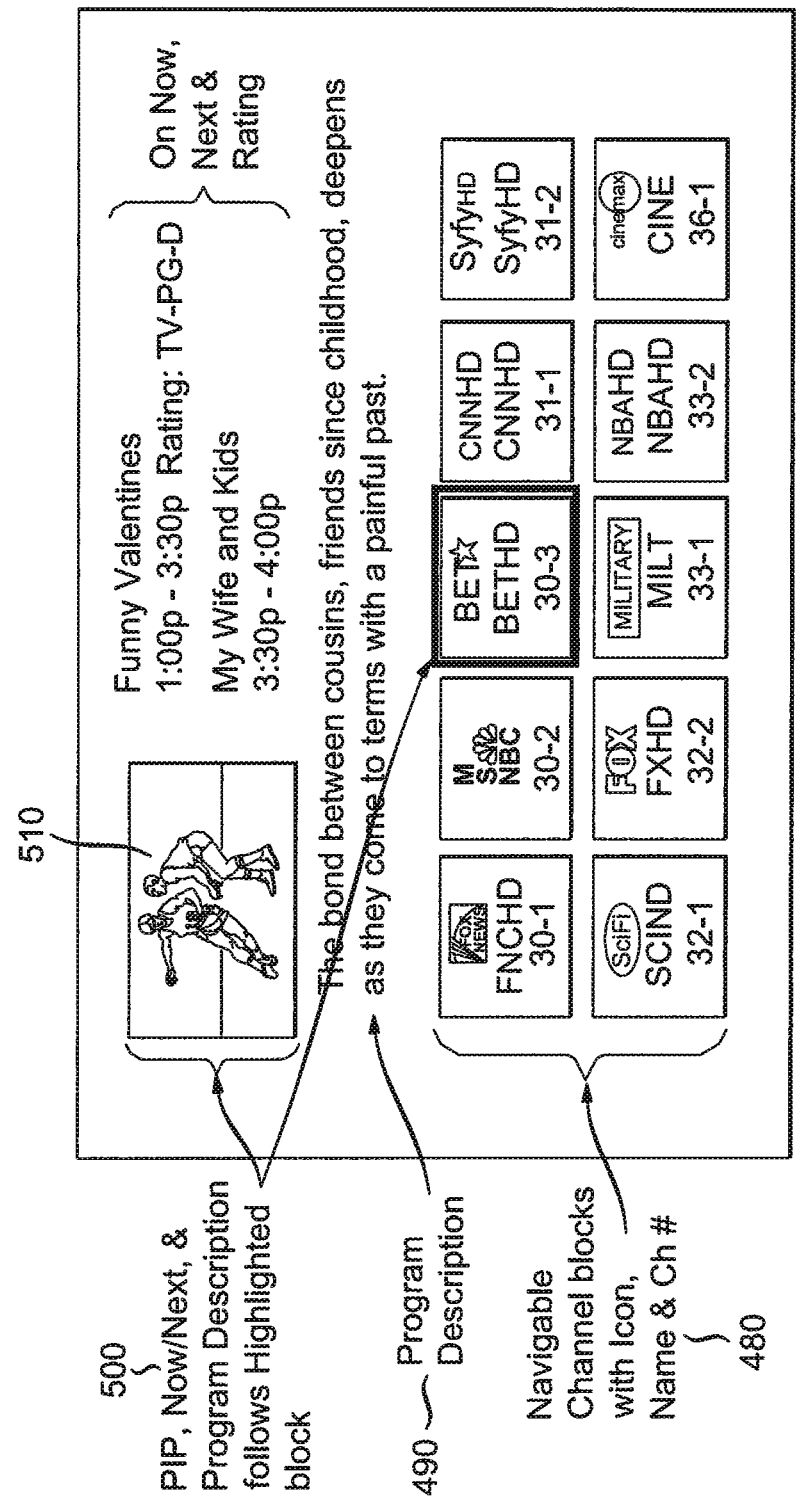
FIG. 11 is a structural diagram of a program guide created in accordance with the inventive methods and systems.

FIG. 11 illustrates the structure of such a program guide and user interface which may be used in remote controls of the present invention and which has been auto-tuned in accordance with the inventive methods. In a preferred embodiment, the program guide is generated by a small receiver, (the Technicolor DCI401MCS receiver) which is also responsible for decrypting the video. It then sends the video and/or UI to a television receiver. The DCI401MCS receiver is similar to a Set Top Box or other receivers. The term "remote control" as used throughout this specification is meant to encompass all such small receivers, Set Top Boxes or other hand-held devices from which a manager of an environment can control the displays in the environment. The guide is specifically shown at 480 and is refreshable and updatable as described herein. In can be seen that when a channel has been highlighted on the guide, for example BETHD 30-3 as shown, a program description 490 is displayed. Other information follows the highlighted block to provide the description as well as the program rating and other pertinent information. 500. Additionally, Picture-in-Picture (PIP) preview in the scaled window 510 is also shown and allows for automatic play, if desired, on the remote control so that the user of the remote control, for example the manager of the sports bar or other environment, can review or preview the program for one or more of the displays.

There have thus been described certain preferred embodiments of content distribution systems in accordance with the present invention. While preferred embodiments have been described and disclosed in will appreciated by those with skill in the art that modification are within the true spirit and scope of the invention. The appended claims are intended to cover all such modifications.

The invention claimed is:

1. A method of generating a user interface which is configured to display a program guide on a remote control used to control program changes on more than one device which is statically tuned to a channel, comprising:

polling devices in a network which contains the devices, each of the devices being configured to statically display programs on fixed channels to determine a list of programs available for display;

populating the remote control with system information including which of the displays are statically displaying programs after polling;

searching the network to locate available channels available for display and to populate the program guide with available channels;

refreshing the program guide so that the program guide can be displayed on the remote control and the program guide is configured to highlight a channel of interest, so that when the channel of interest is highlighted on the remote control, the remote control is tuned to the channel of interest in order to acquire content associated with the channel of interest and to provide a preview of the channel of interest on the remote control; and assigning the channel of interest at least one of the displays so that the at least one display is statically tuned to the channel of interest and is fixed to the channel of interest.

2. The method recited in claim 1, further comprising populating the program guide with available channels after locating the available channels during searching.

3. The method recited in claim 2 wherein the searching is based on criteria set by the user.

4. The method recited in claim 3 wherein the criteria are chosen from among the set including channel name, channel number, text, category and events.

5. The method recited in claim 4, further comprising providing a view to the program guide specified by the user.

6. The method recited in claim 5, further comprising the step of generating a file of containing a list of channels determined during searching so that the program guide can be refreshed.

7. The method recited in claim 6 wherein the refresh includes deleting channels no longer found during searching.

8. The method recited in claim 7, further comprising displaying the refreshed program guide to the user.

9. A remote control which is configured to display a program guide and which can be used by a manager of an environment to statically tune more than one device in the environment to different fixed channels centrally from the remote control, comprising:

a display configured to display and operate the program guide; and a processor configured to:

poll the devices in the environment which contains the devices, each of the devices being configured to statically display programs on the fixed channels to determine a list of programs available for display;

populate the remote control with system information including which of the displays are statically displaying programs after polling;

search the network to locate available channels available for display and to populate the program guide with available channels;

refresh the program guide so that the program guide can be displayed on the remote control and the program guide is configured to highlight a channel of interest, so that when the channel of interest is highlighted on the remote control, the remote control is tuned to the channel of interest in order to acquire content associated with the channel of interest and to provide a preview of the channel of interest on the remote control; and assign the channel of interest at least one of the displays so that the at least one display is statically tuned to the channel of interest and is fixed to the channel of interest.

10. The remote control recited in claim 9 wherein the criteria are chosen from among the set including channel name, channel number, text, category and events.

* * * * *